(12) United States Patent
Kelley

(10) Patent No.: US 7,328,244 B1
(45) Date of Patent: Feb. 5, 2008

(54) ELECTRONIC MAIL SYSTEM

(75) Inventor: Edward E. Kelley, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 1053 days.

(21) Appl. No.: 09/433,504

(22) Filed: Nov. 3, 1999

(51) Int. Cl.
G06F 15/16 (2006.01)
G06F 7/00 (2006.01)
G06F 17/30 (2006.01)

(52) U.S. Cl. ............ 709/206; 709/201; 709/203; 709/217; 707/10; 707/200

(58) Field of Classification Search ......... 709/206, 709/201, 203, 217; 707/10, 200; 395/621
See application file for complete search history.

(56) References Cited

U.S. PATENT DOCUMENTS

| | | | |
|---|---|---|---|
| 5,659,746 A * | 8/1997 | Bankert et al. | 395/621 |
| 5,706,434 A | 1/1998 | Kremen et al. | |
| 5,765,170 A * | 6/1998 | Morikawa | 707/200 |
| 5,778,367 A | 7/1998 | Wesinger, Jr. et al. | |
| 5,848,409 A | 12/1998 | Ahn | |
| 5,862,223 A | 1/1999 | Walker et al. | |
| 5,892,900 A | 4/1999 | Ginter et al. | |
| 6,088,696 A * | 7/2000 | Moon et al. | 707/10 |
| 6,092,103 A * | 7/2000 | Pritsch | 709/206 |
| 6,122,632 A * | 9/2000 | Botts et al. | 707/10 |
| 6,301,608 B1 * | 10/2001 | Rochkind | 709/206 |
| 6,360,221 B1 * | 3/2002 | Gough et al. | 707/10 |
| 2002/0194177 A1 * | 12/2002 | Sherman et al. | 707/8 |
| 2005/0188041 A1 * | 8/2005 | Kuriki et al. | 709/206 |

* cited by examiner

*Primary Examiner*—William Bashore
*Assistant Examiner*—Chau Nguyen
(74) *Attorney, Agent, or Firm*—DeLio & Peterson, LLC; Kelly M. Nowak; Kerry B. Goodwin

(57) ABSTRACT

The present invention discloses a method and apparatus, preferably embodied as a computer program product, wherein e-mail is classified according to categories by imbedding a category identifier into the header of the e-mail message. The invention also provides for a series of electronic storage sites such that upon downloading the e-mail containing the category identifier onto a client computer, the e-mail message is placed into a storage site corresponding to the category identifier. A user of the present invention would no longer need to search through every e-mail message to find a specific e-mail message regarding a particular category. A category table is provided which contains the category identifiers or designators with which to categorize the e-mail message.

19 Claims, 4 Drawing Sheets

Category Table

| |
|---|
| Personal Mail |
| Payments |
| Business Mail |
| Advertisments |
| . . . . |

FIG. 4

ELECTRONIC MAIL SYSTEM

BACKGROUND OF THE INVENTION

1. Field of the Invention

This invention is directed to a method of and apparatus for communicating via a network of computers, namely an electronic mail system wherein outgoing and incoming mail is categorized for added user friendliness.

2. Description of Related Art

The Internet has expanded the communications ability of a typical client/server environment wherein networked clients could communicate with each other. With the advent of the Internet, a typical home personal computer (PC) can communicate with another PC around the world without having to pay long distance telephone charges. Electronic mail (or e-mail) can be used to send messages to anyone who is connected to the Internet or to a computer network that has a connection to the Internet such as an online service.

E-mail software enables the user to read their e-mail after the Internet delivers the e-mail to the user's mail box, compose new mail, and respond to their messages. When someone sends an e-mail message via the Internet, the e-mail message is sent to a mail server wherein the e-mail software on the client computer logs in to see whether the user has any e-mail. When the user wants to read the e-mail message, the software downloads the message to the user's client computer where the user can read it, file it delete it, or respond to it.

Since the volume of e-mail has increased dramatically over the last few years, it is not uncommon to find tens or hundreds of e-mail messages waiting for the client user's response. The difficulty encountered by users nowadays has to do with managing the volume of e-mail being sent and received. In addition to legitimate e-mail from family, friends and colleagues, there is also junk e-mail known as "spam." It is time consuming and tedious to have to review every e-mail message before finding the one of importance. Thus, it would be desirable to have a method and apparatus for categorizing the e-mail as it is being sent so that it may be categorized as it is received.

The typical e-mail software enables the user to create electronic storage sites to categorize and store e-mail that has been received. However, this method of storing the e-mail must be performed "manually" by the user after the e-mail software has downloaded the individual message onto the user's client computer. Upon reading the e-mail message, the user may store the message in an electronic folder in a category of their choosing for later reference.

Bearing in mind the problems and deficiencies of the prior art, it is therefore an object of the present invention to provide a method and apparatus for categorizing e-mail messages as they are sent and received.

It is another object of the present invention to provide a method and apparatus for sending and receiving electronic mail wherein the e-mail messages are categorized for added user friendliness.

A further object of the invention is to provide an electronic mail software for categorizing e-mail as it is sent and received.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, a method of sending an e-mail message from a first client computer to a second client computer via a network, the method comprising the steps of: (a) creating an e-mail message on a first client computer; (b) providing a plurality of category identifiers for categorizing the e-mail message; (c) selecting a category identifier for the e-mail message from the plurality of category identifiers; (d) incorporating the category identifier into the e-mail message; (e) sending the e-mail message having the category identifier from the first client computer; (f) receiving, by a second client computer, the e-mail message having the category identifier, the second client computer having a plurality of electronic storage sites corresponding to the plurality of category identifiers; (g) placing the e-mail message having the category identifier in an electronic storage site corresponding to the category identifier; (h) selecting, by a user of the second client computer, a particular electronic storage site; and (i) viewing e-mail messages stored in the particular electronic storage site.

Preferably, step (c) may comprise selecting a category identifier for the e-mail message from a category table having a plurality of designators for classifying e-mail messages. Preferably, step (c) may comprise selecting a category identifier for the e-mail message from a plurality of category identifiers and imbedding the category identifier in a header of the e-mail message. Preferably, during step (f) if the e-mail message does not contain a category identifier, the e-mail message is placed in a default storage site stored on the second client computer.

In another aspect, the present invention to directed to a method of sending an e-mail message from an originator's client computer to a receiver's client computer comprising the steps of: (a) creating an e-mail message; (b) selecting a category for the e-mail message from a plurality of categories in a category table stored on the originator's client computer to form a categorized e-mail message; and (c) sending the categorized e-mail message via a server to the receiver's client computer having a plurality of electronic storage sites corresponding to the plurality of categories.

Preferably, during step (b) if no category is selected for the e-mail message then the e-mail message is adapted to be stored in a general storage site when received by the receiver's client computer. Preferably, step (b) may further include imbedding the category in a header of the e-mail message such that the e-mail message is placed in an electronic storage site corresponding to the category when the e-mail is received by the receiver's client computer. Preferably, step (b) comprises selecting a category for the e-mail message from a plurality of categories in a category table stored on the originator's client computer.

In yet another aspect, the present invention is directed to a method of receiving e-mail messages comprising the steps of: (a) establishing a plurality of electronic storage sites corresponding to a plurality of categories capable of being imbedded in a header of an e-mail message sent from an originator, the plurality of electronic storage sites adapted to store one or more of the e-mail messages having a corresponding category; (b) receiving an e-mail message having one of the plurality of categories imbedded in a header of the e-mail message; (c) storing the e-mail message in one of the plurality of electronic storage sites corresponding to the category imbedded in the e-mail message; (d) selecting one of the plurality of electronic storage sites; and (e) viewing the e-mail messages stored in one of the plurality of electronic storage sites. Preferably, if step (b) comprises receiving an e-mail message without a category, the e-mail is stored in a default electronic storage site in step (c).

In yet another aspect, the present invention is directed to a method of receiving an electronic mail message, the message having included therein an identifier of one of a plurality of categories, the method comprising the steps of: (a) establishing a plurality of storage sites, characterized as electronic folders, corresponding respectively to the categories; (b) receiving the electronic mail message; (c) storing the message in an electronic folder in accordance with the category of the message; and (d) selecting a particular electronic folder so as to view messages of a particular category.

In still yet another aspect, the present invention is directed to a category table stored on a client computer comprising a plurality of predetermined designators for classifying e-mail messages. Preferably, the designators of the category table correspond to a plurality of storage sites for storing e-mail messages.

In still yet another aspect, the present invention is directed to a method of creating and utilizing a category identifier table comprising the steps of: (a) providing a plurality of designators for classifying e-mail messages, the plurality of designators corresponding to a plurality of electronic storage sites located on a client computer of a receiver of an e-mail message; and (b) incorporating a designator into an e-mail message, the designator selected by an originator of the e-mail message, wherein the e-mail message is sent to the receiver such that upon receipt, the e-mail message is stored in one of the plurality of electronic storage sites corresponding to the designator selected by the originator of the e-mail message.

In a further aspect, the present invention is directed to a program storage device readable by a machine, tangibly embodying a program of instructions executable by the machine to perform method steps for sending an e-mail message created on a first client computer for receiving by a second client computer, the method steps comprising: (a) providing a plurality of category identifiers such that the user of the first client computer can select one of the plurality of category identifiers; (b) incorporating one of the plurality of category identifiers into the e-mail message selected by a user of the first client computer; (c) sending the e-mail message having the one of the plurality of category identifiers to a recipient at a second client computer; and (d) placing the e-mail message having one of the plurality of category identifiers in one of a plurality of electronic storage sites located on the second client computer, the plurality of electronic storage sites corresponding to the plurality of category identifiers.

In a further aspect, the present invention is directed to a program storage device readable by a machine, tangibly embodying a program of instructions executable by the machine to perform method steps for sending an e-mail message from an originator's client computer to a receiver's client computer, the method steps comprising: (a) providing a plurality of category identifiers in which to categorize an e-mail message; (b) categorizing an e-mail message when an originator of the e-mail message selects one of the plurality of category identifiers; (c) imbedding a selected category identifier into the e-mail message; (d) sending the e-mail message having the selected category identifier to a receiver's client computer having a plurality of storage sites corresponding to the plurality of category identifiers; and (e) storing the e-mail message on the receiver's client computer in a storage site corresponding to the selected category identifier.

In a further aspect, the present invention is directed to a program storage device readable by a machine, tangibly embodying a program of instructions executable by the machine to perform method steps for receiving e-mail messages, the method steps comprising (a) establishing a plurality of storage sites on a receiver's client computer, the plurality of storage sites corresponding to a plurality of category identifiers capable of being imbedded in a header of an e-mail message received by the receiver; (b) downloading an e-mail message having a category identifier selected from the plurality of category identifiers from a server; (c) storing the e-mail message in one of the plurality of storage sites corresponding to the category identifier of the e-mail message; and (d) enabling the receiver to select one of the plurality of storage sites to view e-mail messages stored within.

In still a further aspect, the present invention is directed to a computer program product comprising a computer usable medium having computer readable program code means embodied therein for sending and receiving e-mail messages, the computer program product having: computer readable program code means for causing a computer to create an e-mail message in computer readable form based on a user's input; computer readable program code means for providing a plurality of category identifiers to categorize the e-mail message wherein one of the plurality of category identifiers is selected for the e-mail message; computer readable program code means for causing the computer to send the e-mail message to another computer; computer readable program code means for causing the computer to receive e-mail messages from another computer; and computer readable program code means for causing the computer to place the e-mail messages upon receipt in one of a plurality of electronic storage sites corresponding to the category identifiers located within the e-mail messages.

In still a further aspect, the present invention is directed to a computer program product comprising a computer usable medium having computer readable program code means embodied therein for sending an e-mail message, the computer program product having: computer readable program code means for causing a computer to create an e-mail message in computer readable form based on a user's input; computer readable program code means for providing a category table comprising a plurality of category identifiers for categorizing the e-mail message; computer readable program code means for causing the computer to imbed a selected category identifier into the e-mail message; and computer readable program code means for causing the computer to send the e-mail message to another computer.

In a final aspect, the present invention is directed to a computer program product comprising a computer usable medium having computer readable program code means embodied therein for causing a computer to receive an e-mail message having a category identifier contained within the e-mail message, the computer program product having: computer readable program code means for causing a computer to establish a plurality of electronic folders corresponding to a plurality of category identifiers capable of being incorporated in an e-mail message sent from another computer, the plurality of electronic folders adapted to store one or more e-mail messages having a corresponding category identifier; computer readable program code means for causing a computer to receive e-mail messages having one of the plurality of category identifiers contained within each e-mail message; computer readable program code means for causing a computer to store the e-mail messages in one of the electronic folders corresponding to the one of the plurality of category identifiers contained within each e-mail message; and computer readable program code means for viewing the e-mail messages stored in one of the electronic folders.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 4 is a category table of the present invention.

DESCRIPTION OF THE PREFERRED EMBODIMENT(S)

Figure 1:
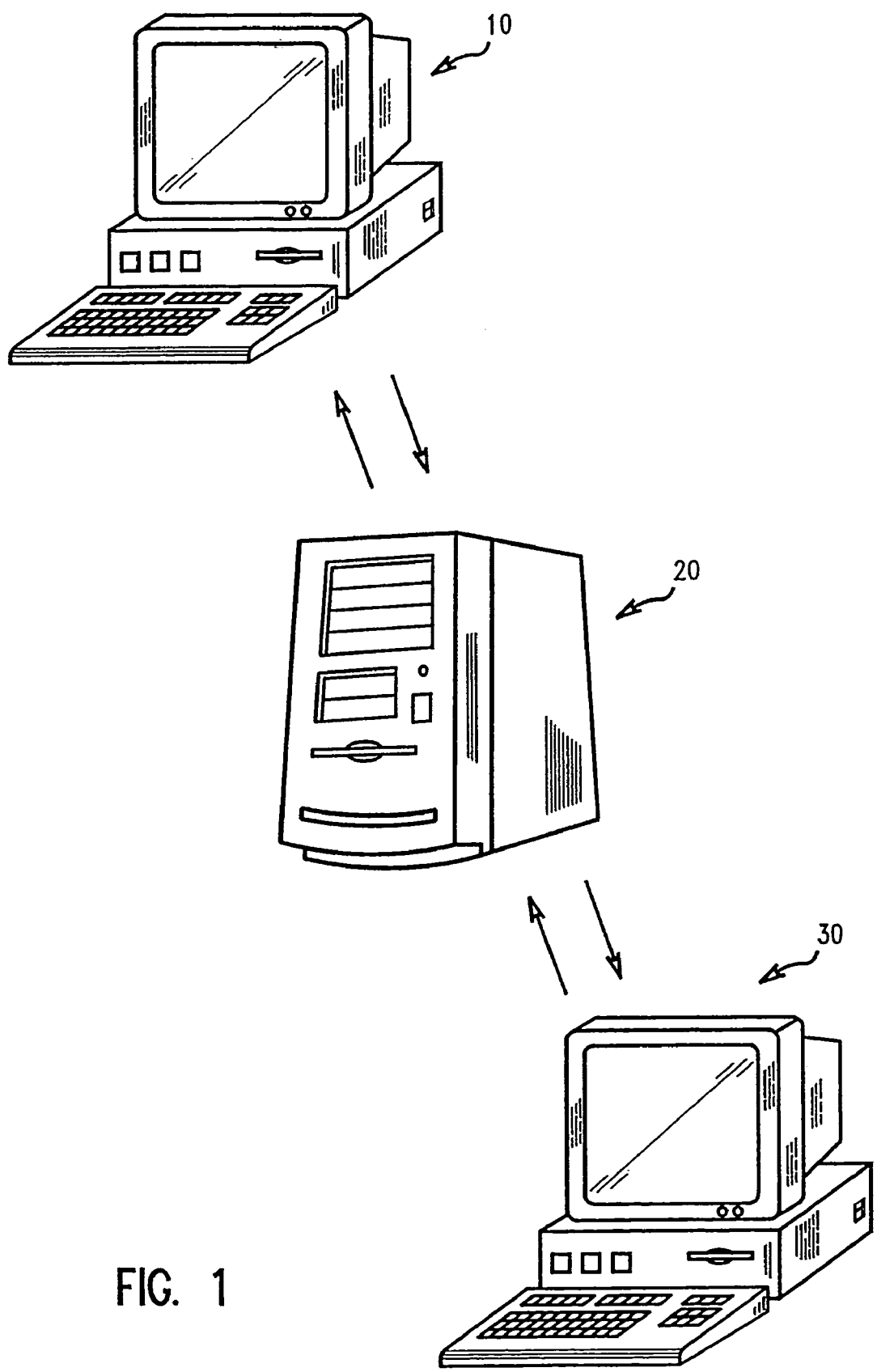
FIG. 1 is a schematic representation of a computer network system which may be used to practice the present invention.

In describing the preferred embodiment of the present invention, reference will be made herein to FIGS. 1–4 of the drawings in which like numerals refer to like features of the invention. Features of the invention are not necessarily shown to scale in the drawings.

The present invention is a method and apparatus for classifying electronic mail as it is sent from a client computer of a sender to the client computer of a receiver. The present invention provides a method and apparatus for identifying and categorizing the mail into different storage sites or electronic folders when the e-mail message is received by the receiver's client computer. The advantage for the receiver of the mail is that specific types of mail may be accessed quickly without having to search through all of the e-mail received.

FIG. 1 is a schematic representation of a computer system which may be used to practice the present invention. Client computers 10, 30 are linked via a network server 20 such that the client computers are capable of sending information to and from each computer. Server 20 makes information available to both client computers 10, 30 using a communication protocol sent over a communication channel such as the Internet or through a dial-up connection, e.g., ISDN line. Client computers 10, 30 and server 20 are capable of utilizing program storage devices embodying machine readable program source code which causes the computers to perform the method steps of the present invention. The program storage devices of the present invention may be devised, made and used as a component of a machine utilizing optics, magnetic properties and/or electronics to perform the method steps of the present invention. Program storage devices include, but are not limited to, magnetic diskettes, magnetic tapes, optical disks, Read Only Memory (ROM), floppy disks, semiconductor chips and the like. The process of the present invention may be utilized as a "plug-in" or incorporated into an e-mail software program.

Figure 2:
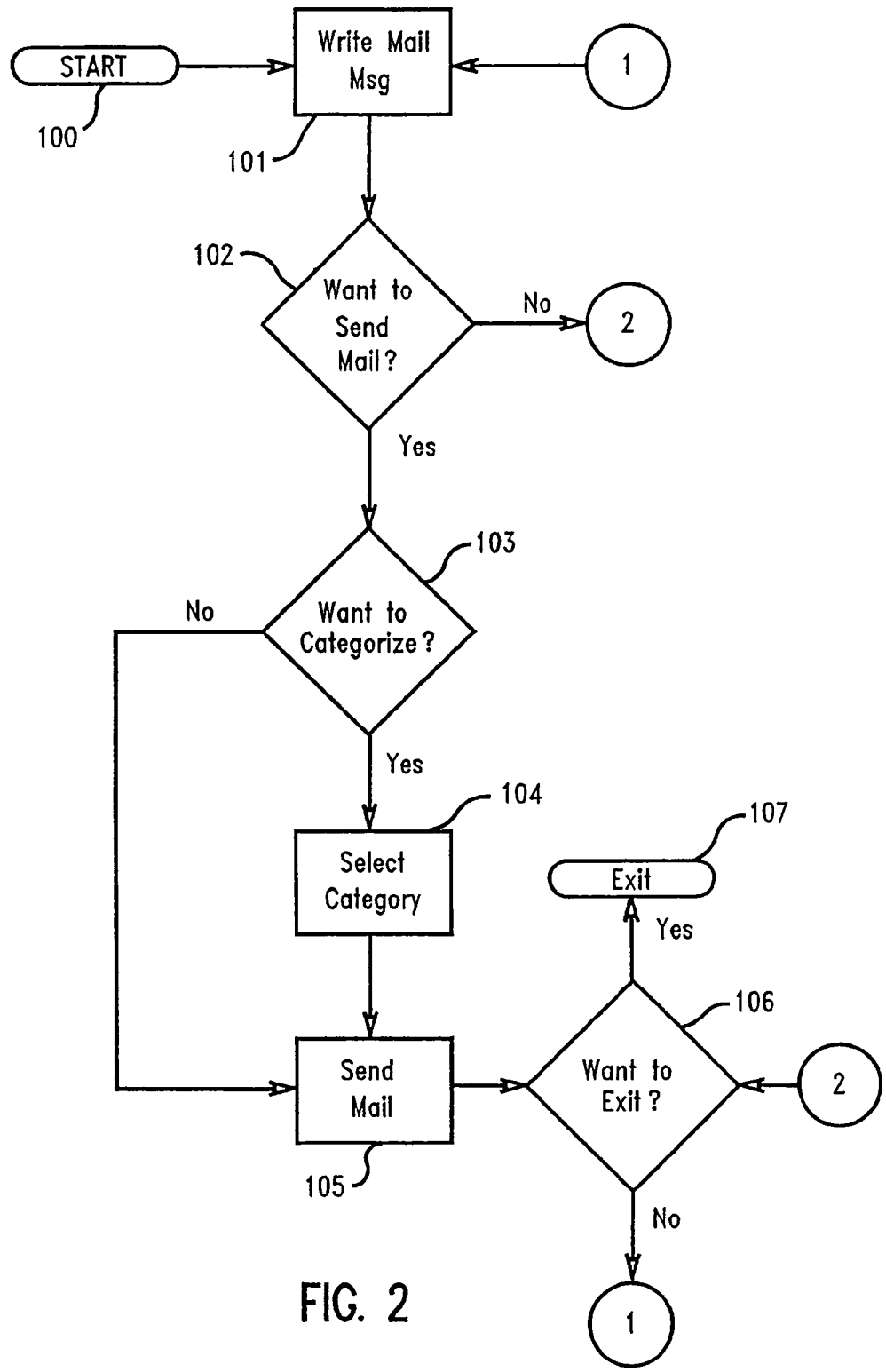
FIG. 2 is a flow diagram illustrating the method steps of the present invention occurring at the client computer of a sender of the e-mail message.

FIG. 2 is a flow diagram illustrating the method steps as it occurs at the sender's client computer. Step 100 begins the process of placing a selected category within the header of the e-mail message. The sender of the e-mail message writes 101 a message that will be sent from client computer 10. Once the e-mail message is completed the sender determines whether or not to send the e-mail message 102. If the sender decides to send the message later or not to send the message at all the process is terminated 106 and exited 107. However, if the sender determines that the e-mail message should be sent, a category is placed in the header of the e-mail 103. The header contains information about the file such as the filename, file size and a category identifier in accordance with the present invention. The present invention embodied in a computer program product can read or view the e-mail message at the receiver's client computer wherein the category identifier in the header distinguishes what file category the message is and processes it accordingly. The mail is then placed in the proper electronic folders or storage sites corresponding to the category included in the e-mail header. The e-mail is sent to the indicated receiver 105 and the sender determines whether or not to exit the program 106.

The present invention provides a category table from which a category identifier is selected 104 and the selected category identifier would then be included in the e-mail header. The category table of the present invention is illustrated in FIG. 4. The category table has entries comprising of different designators used in classifying the e-mail messages. These designators may include but are not limited to personal mail, payments, business mail, advertisements, etc. The designators correspond to the electronic storage sites in which the e-mail messages are stored upon receipt. A default "general mail" category may be added when the sender of the e-mail message does not categorize the e-mail message. Preferably, the category table may be edited by the user to add personalized categories to the predetermined ones.

Figure 3:
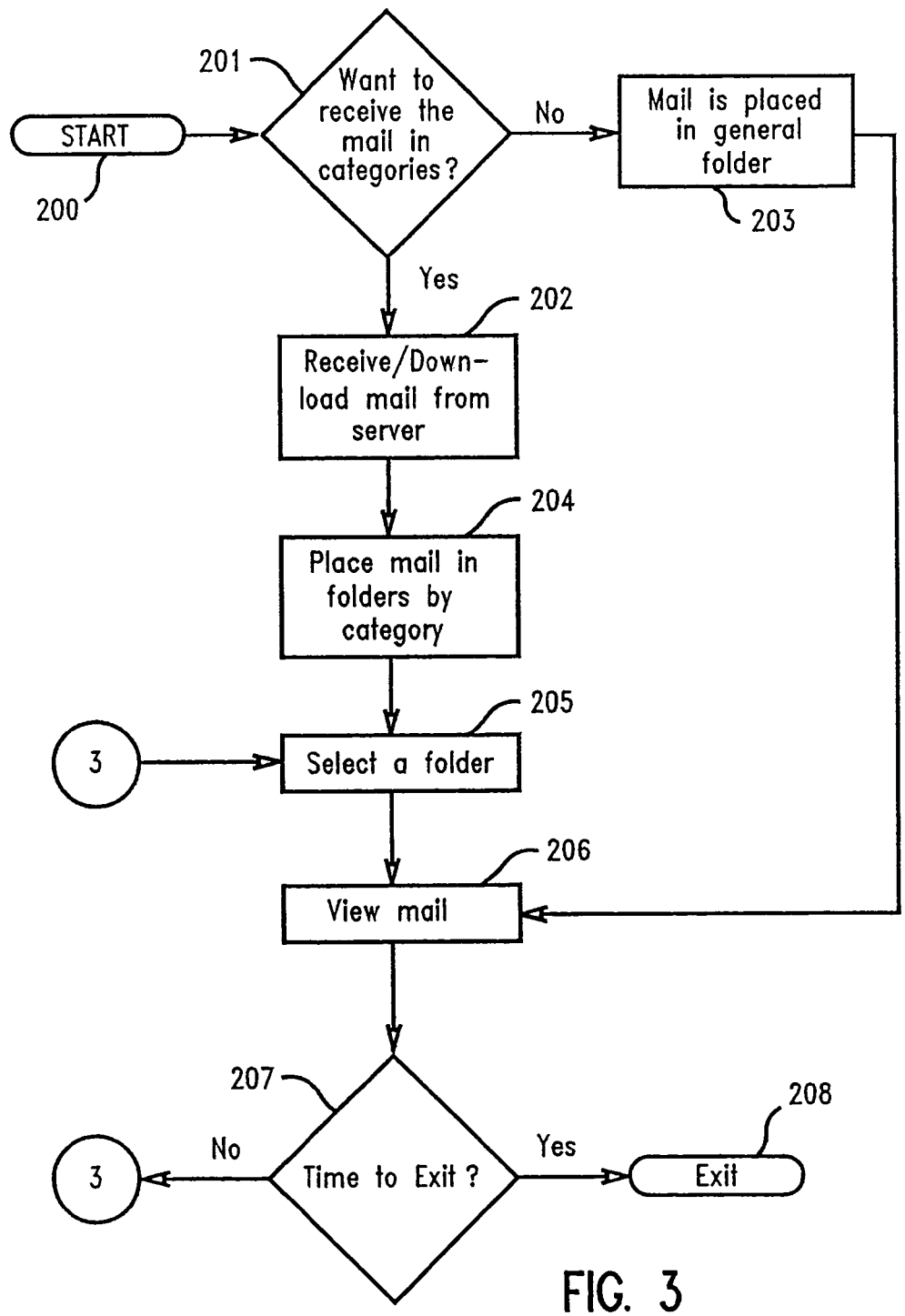
FIG. 3 is a flow diagram illustrating the method steps of the present invention occurring at the client computer of a receiver of the e-mail message.

FIG. 3 is a flow diagram representing the method steps of the present invention as it occurs at the receiver's client computer 30. The process 200 starts when the receiver determines whether or not the mail shall be placed in different electronic folders corresponding to the category identifier included in the e-mail header 201. If the receiver elects not to receive categorized mail, in-coming electronic mail is put in a general folder 203 wherein the messages can be viewed 206. If the receiver elects to receive the mail in categories, the mail is downloaded from server 20 at step 202. The mail is placed in the electronic folders or storage sites corresponding to the category identifier imbedded in the header of the e-mail message 204. The receiver may then select one or more of the folders from the categories 205 to view the mail 206 within the selected electronic folder.

The present invention achieves the objects recited above. The method and apparatus disclosed categorizes e-mail messages as they are sent and received by including a category identifier in the header of the e-mail message. The present invention provides a plurality of electronic storage sites which correspond to the category identifiers. When the e-mail messages are downloaded by a receiver onto their client computer, the e-mail message is stored in an electronic storage site according to its category identifier. A category table is provided which comprises a plurality of designators for categorizing the e-mail messages. There is increased user efficiency and friendliness since a recipient of numerous e-mail messages will not have to search through each e-mail message when looking for a particular message. They can look directly in the electronic storage site in the desired e-mail category to which the e-mail message pertains.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of sending an e-mail message from a first client computer to a second client computer via a network, said method comprising the steps of:
    (a) creating an e-mail message on a first client computer;
    (b) providing a plurality of category identifiers for categorizing said e-mail message;
    (c) selecting at said first client computer by a sender of said e-mail message a category identifier for said e-mail message from said plurality of category identifiers;
    (d) incorporating said category identifier into said e-mail message;
    (e) sending said e-mail message having the category identifier from said first client computer;
    (f) receiving, by a second client computer, said e-mail message having the category identifier, said second client computer having a plurality of electronic storage sites corresponding to said plurality of category identifiers;
    (g) placing said e-mail message having the category identifier in an electronic storage site corresponding to the category identifier;
    (h) selecting, by a user of said second client computer, a particular electronic storage site; and
    (i) viewing e-mail messages stored in said particular electronic storage site.

2. The method of claim 1 wherein step (c) comprises selecting a category identifier for said e-mail message from a category table having a plurality of designators for classifying e-mail messages.

3. The method of claim 1 wherein step (c) comprises selecting a category identifier for said e-mail message from a plurality of category identifiers and imbedding said category identifier in a header of said e-mail message.

4. The method of claim 1 wherein during step (f) if said e-mail message does not contain a category identifier, said e-mail message is placed in a default storage site stored on said second client computer.

5. A method of sending an e-mail message from an originator's client computer to a receiver's client computer comprising the steps of:
    (a) creating an e-mail message;
    (b) selecting a category for said e-mail message from a plurality of categories stored on the originator's client computer to form a categorized e-mail message, said category being selected by a sender of the e-mail message at the originator's client computer; and
    (c) sending said categorized e-mail message via a server to a receiver at the receiver's client computer having a plurality of electronic storage sites corresponding to the plurality of categories.

6. The method of claim 5 wherein during step (b) if no category is selected for said e-mail message then said e-mail message is adapted to be stored in a general storage site when received by the receiver's client computer.

7. The method of claim 5 wherein step (b) further includes imbedding said category in a header of said e-mail message such that said e-mail message is placed in an electronic storage site corresponding to said category when said e-mail is received by the receiver's client computer.

8. The method of claim 5 wherein step (b) comprises selecting a category for said e-mail message from a plurality of categories in a category table stored on the originator's client computer.

9. A method of receiving e-mail messages comprising the steps of:
    (a) establishing a plurality of electronic storage sites corresponding to a plurality of categories selected by a sender of an e-mail message at an originator's client computer, said plurality of electronic storage sites capable of being imbedded in a header of an e-mail message sent from an originator, said plurality of electronic storage sites adapted to store one or more of said e-mail messages having a corresponding category;
    (b) receiving an e-mail message at a receiver's client computer having one of said plurality of categories imbedded in a header of said e-mail message at said originator's client computer;
    (c) storing said e-mail message in one of said plurality of electronic storage sites corresponding to said category imbedded in said e-mail message on said receiver's client computer;
    (d) selecting one of said plurality of electronic storage sites on said receiver's client computer; and
    (e) viewing said e-mail messages stored in said selected one of said plurality of electronic storage sites at said receiver's client computer.

10. The method of claim 9 wherein step (b) further includes receiving an e-mail message without a category, said e-mail is stored in a default electronic storage site in step (c).

11. The method of claim 9 wherein said receiving computer includes a category table comprising a plurality of predetermined designators for classifying e-mail messages.

12. The method of claim 11 wherein said designators of said category table correspond to a plurality of storage sites on said receiving computer for storing e-mail messages.

13. A method of creating and utilizing a category identifier table comprising the steps of:
    (a) providing a plurality of designators for classifying e-mail messages, said plurality of designators corresponding to a plurality of electronic storage sites located on a client computer of a receiver of an e-mail message; and
    (b) incorporating a designator into an e-mail message, said designator selected by an originator of the e-mail message,
wherein the e-mail message is sent to the receiver such that upon receipt, said e-mail message is stored in one of said plurality of electronic storage sites corresponding to said designator selected by the originator of the e-mail message.

14. A program storage device readable by a machine, tangibly embodying a program of instructions executable by the machine to perform method steps for sending an e-mail message created on a first client computer for receiving by a second client computer, said method steps comprising:
    (a) providing a plurality of category identifiers such that said user of said first client computer can select one of said plurality of category identifiers;
    (b) selecting by the user of said first client computer one of said plurality of category identifiers;
    (c) incorporating the selected one of said plurality of category identifiers into said e-mail message selected by the user of said first client computer;

(d) sending said e-mail message having the one of said plurality of category identifiers to a recipient at a second client computer; and (e) placing said e-mail message having one of said plurality of category identifiers in one of a plurality of electronic storage sites located on said second client computer, said plurality of electronic storage sites corresponding to said plurality of category identifiers.

15. A program storage device readable by a machine, tangibly embodying a program of instructions executable by the machine to perform method steps for sending an e-mail message from an originator's client computer to a receiver's client computer, said method steps comprising:

(a) providing a plurality of category identifiers in which to categorize an e-mail message;

(b) categorizing an e-mail message by an originator of said e-mail message selecting one of said plurality of category identifiers;

(c) imbedding the selected category identifier into said e-mail message;

(d) sending said e-mail message having the selected category identifier to a receiver's client computer having a plurality of storage sites corresponding to said plurality of category identifiers; and (e) storing said e-mail message on the receiver's client computer in a storage site corresponding to said selected category identifier.

16. A program storage device readable by a machine, tangibly embodying a program of instructions executable by the machine to perform method steps for receiving e-mail messages, said method steps comprising:

(a) establishing a plurality of storage sites on a receiver's client computer corresponding to a plurality of category identifiers selected by a sender at a sender's client computer, said plurality of category identifiers being imbedded in a plurality of e-mail messages;

(b) downloading at the receiver's client computer an e-mail message having a category identifier selected from said plurality of category identifiers selected by said sender at the sender's client computer;

(c) storing said e-mail message in one of said plurality of storage sites corresponding to the category identifier of said e-mail message at the receiver's client computer; and (d) enabling the receiver to select one of said plurality of storage sites to view e-mail messages stored within.

17. A computer program product comprising:

a computer usable medium having computer readable program code means embodied therein for sending and receiving e-mail messages, said computer program product having:

computer readable program code means for causing a computer to create an e-mail message in computer readable form based on a sender's input, whereby the sender selects a category identifier for incorporating therein said e-mail message at said computer;

computer readable program code means for providing a plurality of category identifiers to categorize said e-mail message wherein one of said plurality of category identifiers is selected for said e-mail message by said sender;

computer readable program code means for causing said computer to send said e-mail message to another computer;

computer readable program code means for causing said another computer to receive said e-mail messages from said computer; and computer readable program code means for causing said another computer to place said e-mail messages upon receipt in one of a plurality of electronic storage sites corresponding to said category identifiers selected at said computer and located within said e-mail messages.

18. A computer program product comprising:

a computer usable medium having computer readable program code means embodied therein for sending an e-mail message, said computer program product having:

computer readable program code means for causing a computer to create an e-mail message in computer readable form based on a user's input;

computer readable program code means for providing a category table comprising a plurality of category identifiers for categorizing said e-mail message, said plurality of category identifiers being provided at said computer;

computer readable program code means for causing said computer to imbed a selected category identifier into said e-mail message, said category identifier being selected by said user; and computer readable program code means for causing said computer to send said e-mail message, having said selected category identifier embedded therein, to another computer.

19. A computer program product comprising:

a computer usable medium having computer readable program code means embodied therein for causing a computer to receive an e-mail message having a category identifier contained within said e-mail message whereby said category identifier is selected by a user at a sending computer, said computer program product having:

computer readable program code means for causing a receiving computer to establish a plurality of electronic folders corresponding to a plurality of category identifiers capable of being incorporated in an e-mail message sent from said sending computer, said plurality of electronic folders adapted to store one or more e-mail messages having a corresponding category identifier as selected by said user at said sending computer;

computer readable program code means for causing a receiving computer to receive e-mail messages having one of said plurality of category identifiers contained within each e-mail message;

computer readable program code means for causing a receiving computer to store said e-mail messages in one of said electronic folders corresponding to the one of said plurality of category identifiers contained within each e-mail message; and computer readable program code means for viewing said e-mail messages stored in one of said electronic folders at said receiving computer.

* * * * *